US012039574B2

(12) United States Patent
Santiago

(10) Patent No.: US 12,039,574 B2
(45) Date of Patent: Jul. 16, 2024

(54) PROGRAMMATIC ADVERTISING SERVER

(71) Applicant: NIMBUS ADVERTISING SOLUTIONS INC., New York, NY (US)

(72) Inventor: Marc Santiago, Jersey City, NJ (US)

(73) Assignee: NIMBUS ADVERTISING SOLUTIONS INC., New York, NY (US)

( * ) Notice: Subject to any disclaimer, the term of this patent is extended or adjusted under 35 U.S.C. 154(b) by 0 days.

(21) Appl. No.: 18/230,919

(22) Filed: Aug. 7, 2023

(65) Prior Publication Data

US 2024/0086973 A1    Mar. 14, 2024

Related U.S. Application Data

(63) Continuation of application No. 18/057,506, filed on Nov. 21, 2022, now Pat. No. 11,720,931, which is a
(Continued)

(51) Int. Cl.
*G06Q 30/0273* (2023.01)
*G06F 16/955* (2019.01)
(Continued)

(52) U.S. Cl.
CPC ..... *G06Q 30/0275* (2013.01); *G06F 16/9566* (2019.01); *G06F 40/205* (2020.01);
(Continued)

(58) Field of Classification Search
CPC ........... G06Q 30/0275; G06Q 30/0255; G06Q 30/0257; G06Q 30/0267; G06Q 30/0269; G06F 16/9566; G06F 40/205
See application file for complete search history.

(56) References Cited

U.S. PATENT DOCUMENTS 11,507,982 B2   11/2022   Santiago
11,720,931 B2   8/2023    Santiago
(Continued)

FOREIGN PATENT DOCUMENTS

CA          2999508 A1      4/2017
WO    WO-2013/052936 A1    4/2013
(Continued)

OTHER PUBLICATIONS

Extended European Search Report for EP Application No. 20741777.5 dated Sep. 13, 2022.
(Continued)

*Primary Examiner* — Sam Refai
*Assistant Examiner* — Kyle G Robinson
(74) *Attorney, Agent, or Firm* — Foley Hoag LLP; Erik A. Huestis; Joshua S. Matloff

(57) ABSTRACT

Systems, methods, and computer program products are provided for auctioning advertising inventory for various applications, including for mobile applications. In various embodiments, a request for an advertisement is received at a first server from a client device. The request is sent, from the first server, to two or more remote servers. A bid value and an asset to be presented at the client device is received from each of the two or more remote servers. A highest bid is determined from the received bid values. Whether the asset associated with the highest bid is compliant based on the request is determined. When the asset is determined to be compliant, the asset is sent to the client device.

23 Claims, 10 Drawing Sheets

Related U.S. Application Data continuation of application No. 16/746,724, filed on Jan. 17, 2020, now Pat. No. 11,507,982.

(60) Provisional application No. 62/794,314, filed on Jan. 18, 2019.

(51) Int. Cl.
   *G06F 40/205* (2020.01)
   *G06Q 30/0251* (2023.01)

(52) U.S. Cl.
   CPC ..... *G06Q 30/0255* (2013.01); *G06Q 30/0257* (2013.01); *G06Q 30/0267* (2013.01); *G06Q 30/0269* (2013.01)

(56) References Cited

U.S. PATENT DOCUMENTS

| | | | | |
|---|---|---|---|---|
| 2010/0114680 | A1* | 5/2010 | Steelberg | G06Q 30/02 235/375 |
| 2014/0101163 | A1 | 4/2014 | Adams et al. | |
| 2014/0136342 | A1 | 5/2014 | Ringdahl | |
| 2014/0278981 | A1 | 9/2014 | Mersov et al. | |
| 2014/0297401 | A1 | 10/2014 | Bax et al. | |
| 2016/0134694 | A1 | 5/2016 | Berdichevsky et al. | |
| 2016/0307236 | A1* | 10/2016 | Lidow | G06Q 30/0275 |
| 2017/0098252 | A1 | 4/2017 | Box et al. | |
| 2017/0287009 | A1 | 10/2017 | Austin et al. | |
| 2018/0152536 | A1 | 5/2018 | Abrams et al. | |
| 2018/0158111 | A1 | 6/2018 | Zgliczynski et al. | |
| 2018/0270544 | A1 | 9/2018 | Ray et al. | |
| 2018/0288495 | A1 | 10/2018 | Bennett et al. | |
| 2020/0234342 | A1 | 7/2020 | Santiago | |
| 2023/0079585 | A1 | 3/2023 | Santiago | |

FOREIGN PATENT DOCUMENTS

| | | |
|---|---|---|
| WO | WO-2014/055829 A1 | 4/2014 |
| WO | WO-2020/150673 A1 | 7/2020 |

OTHER PUBLICATIONS

IAB Digital Video Committee; "iab Video Ad Serving Template (VAST) Version 3.0" Specification Document: 71 pages (2012).

IAB, "RTB Project OpenRTB API Specification" Version 2.1: 80 PAGES, http://www.iab.net/media/file/OpenRTB-API-Specification-Version-2-1-FINAL.pdf, (2012).

International Search Report and Written Opinion for International Application No. PCT/US20/14203 dated Apr. 7, 2020.

Kappos, "Subject Matter Eligibility of Computer Readable Media," USPTO (1 page) (2010).

Maino, Elia; VastParser profile on GitHUB; vast-client-js/docs/api/vast-parser.md; <https://github.com/dailymotion/vast-client-js/blob/bbeaf3468a94bcbfc60798c2f5fc1c470ba906b5/docs/api/vast-parser.md>: 4 pages (Year 2018).

* cited by examiner

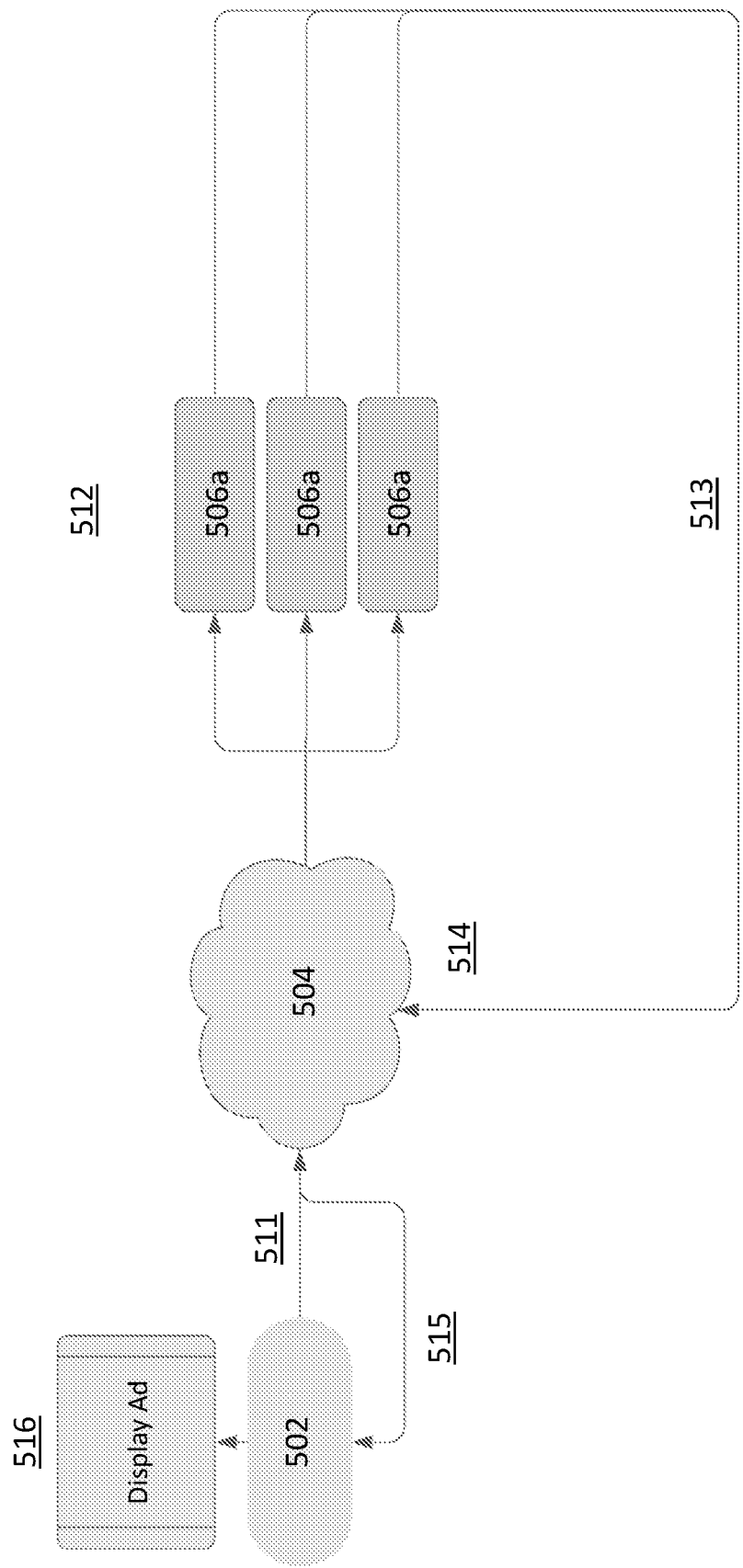

```
<?xml version="1.0" encoding="UTF-8"?> Santiago, 3/20/18, 8:51 PM • Vast: Optimizing the unwrapper
<VAST version="2.0">
  <Ad id="00000">
    <Wrapper>
      <AdSystem version="2.0">TimeHop Test</AdSystem>
      <VASTAdTagURI><![CDATA[http://s3.amazonaws.com/nimbus.test.ads/depth1_vast.xml]]></VASTAdTagURI>
      <Error><![CDATA[]]></Error>
      <Impression id="TimeHop"><![CDATA []]></Impression>
      <Creatives>
        <Creative id="00000" AdID="00000">
          <Linear>
            <TrackingEvents>
              <Tracking event="start"><![CDATA[]]></Tracking>
              <Tracking event="skip"><![CDATA[]]></Tracking>
              <Tracking event="firstQuartile"><![CDATA[]]></Tracking>
              <Tracking event="midpoint"><![CDATA[]]></Tracking>
              <Tracking event="thirdQuartile"><![CDATA[]]></Tracking>
              <Tracking event="complete"><![CDATA[]]></Tracking>
            </TrackingEvents>
            <VideoClicks>
              <ClickTracking id=""><![CDATA[]]></ClickTracking>
            </VideoClicks>
          </Linear>
        </Creative>
      </Creatives>
    </Wrapper>
  </Ad>
</VAST>
```

Unwrapping and storing all the trackers by calling the VastAdTagURL (1)

```xml
<?xml version="1.0"?>     Santiago, 6/22/19, 12:31 AM • Video: Updating tests, don't use real network calls
<VAST xmlns:xsi="http://www.w3.org/2001/XMLSchema-instance" xsi:noNamespaceSchemaLocation="vast.xsd" version="2.0">
  <Ad id="00000">
    <Wrapper>
      <AdSystem version="6.11.0-6.15.0">Timehop D1</AdSystem>
      <VASTAdTagURI><![CDATA[
http://s3.amazonaws.com/nimbus.test.ads/depth2_vast.xml
]]></VASTAdTagURI>
      <Error><![CDATA[]]></Error>
      <Impression><![CDATA[]]></Impression>
      <Impression><![CDATA[]]></Impression>
      <Impression><![CDATA[]]></Impression>
      <Creatives>
        <Creative AdID="00000">
          <Linear>
            <TrackingEvents>
              <Tracking event="resume"><![CDATA[]]></Tracking>
              <Tracking event="acceptInvitation"><![CDATA[]]></Tracking>
              <Tracking event="collapse"><![CDATA[]]></Tracking>
              <Tracking event="thirdQuartile"><![CDATA[]]></Tracking>
              <Tracking event="close"><![CDATA[]]></Tracking>
              <Tracking event="creativeView"><![CDATA[]]></Tracking>
              <Tracking event="fullscreen"><![CDATA[]]></Tracking>
              <Tracking event="complete"><![CDATA[]]></Tracking>
              <Tracking event="start"><![CDATA[]]></Tracking>
              <Tracking event="rewind"><![CDATA[]]></Tracking>
              <Tracking event="unmute"><![CDATA[]]></Tracking>
              <Tracking event="expand"><![CDATA[]]></Tracking>
              <Tracking event="mute"><![CDATA[]]></Tracking>
              <Tracking event="midpoint"><![CDATA[]]></Tracking>
              <Tracking event="pause"><![CDATA[]]></Tracking>
              <Tracking event="firstQuartile"><![CDATA[]]></Tracking>
            </TrackingEvents>
            <VideoClicks>
              <ClickTracking><![CDATA[]]></ClickTracking>
            </VideoClicks>
          </Linear>
        </Creative>
      </Creatives>
    </Wrapper>
  </Ad>
</VAST>
```

Unwrapping and storing all the trackers by calling the VastAdTagURL (2)

```xml
<?xml version="1.0"?>   Santiago, 6/22/19, 12:31 AM ° Video: Updating tests, don't use real network calls
<VAST xmlns:xsi=http://www.w3.org/2001/XMLSchema-instance" xsi:noNamespaceSchemaLocation="vast.xsd" version="2.0">
  <Ad id="00000">
    <Wrapper>
      <AdSystem version="6.11.0-6.15.0">Timehop D1</AdSystem>
      <VASTAdTagURI><![CDATA[
http://s3.amazonaws.com/nimbus.test.ads/inline_vast.xml
]]></VASTAdTagURI>
      <Error><![CDATA[ ]]></Error>
      <Impression><![CDATA[ ]]></Impression>
      <Impression><![CDATA[ ]]></Impression>
      <Impression><![CDATA[ ]]></Impression>
      <Creatives>
        <Creative AdID="00000">
          <Linear>
            <TrackingEvents>
              <Tracking event="resume"><![CDATA[ ]]></Tracking>
              <Tracking event="acceptInvitation"><![CDATA[ ]]></Tracking>
              <Tracking event="collapse"><![CDATA[ ]]></Tracking>
              <Tracking event="thirdQuartile"><![CDATA[ ]]></Tracking>
              <Tracking event="close"><![CDATA[ ]]></Tracking>
              <Tracking event="creativeView"><![CDATA[ ]]></Tracking>
              <Tracking event="fullscreen"><![CDATA[ ]]></Tracking>
              <Tracking event="complete"><![CDATA[ ]]></Tracking>
              <Tracking event="start"><![CDATA[ ]]></Tracking>
              <Tracking event="rewind"><![CDATA[ ]]></Tracking>
              <Tracking event="unmute"><![CDATA[ ]]></Tracking>
              <Tracking event="expand"><![CDATA[ ]]></Tracking>
              <Tracking event="mute"><![CDATA[ ]]></Tracking>
              <Tracking event="midpoint"><![CDATA[ ]]></Tracking>
              <Tracking event="pause"><![CDATA[ ]]></Tracking>
              <Tracking event="firstQuartile"><![CDATA[ ]]></Tracking>
            </TrackingEvents>
            <VideoClicks>
              <ClickTracking><![CDATA[ ]]></ClickTracking>
            </VideoClicks>
          </Linear>
        </Creative>
      </Creatives>
    </Wrapper>
  </Ad>
</VAST>
```

Unwrapping and storing all the trackers by calling the VastAdTaqURL (3)

```xml
<?xml version="1.0" encoding="UTF-8"?>
<VAST xmlns:xsi="http://www.w3.org/2001/XMLSchema-instance" xsi:noNamespaceSchemaLocation="vast.xsd" version="2.0">
    <Ad id="00000">
        <InLine>
            <AdSystem><![CDATA[TimeHop Inline]]></AdSystem>
            <Impression id="Impression" />
            <Creatives>
                <Creative id="00000" AdID="00000" sequence="1">
                    <Linear>
                        <Duration>00:00:20</Duration>
                        <TrackingEvents>
                            <Tracking event="creativeView" />
                            <Tracking event="creativeView" />
                            <Tracking event="start" />
                            <Tracking event="firstQuartile" />
                            <Tracking event="midpoint" />
                            <Tracking event="thirdQuartile" />
                            <Tracking event="complete" />
                            <Tracking event="mute" />
                            <Tracking event="unmute" />
                            <Tracking event="pause" />
                            <Tracking event="fullscreen" />
                        </TrackingEvents>
                        <VideoClicks>
                            <ClickThrough />
                        </VideoClicks>
                        <MediaFiles>
                            <MediaFile id="348109697" height="720" width="1280" bitrate="1733" type="video/mp4" delivery="progressive" maintainAspectRatio="true" scalable="true"><![CDATA[https://s3.amazonaws.com/nimbus.test.ads/test_video.mp4]]></MediaFile>
                            <MediaFile id="348109698" height="720" width="1280" bitrate="1057" type="video/mp4" delivery="progressive" maintainAspectRatio="true" scalable="true"><![CDATA[https://s3.amazonaws.com/nimbus.test.ads/test_video.mp4]]></MediaFile>
                            <MediaFile id="348109699" height="720" width="1280" bitrate="1091" type="video/webm" delivery="progressive" maintainAspectRatio="true" scalable="true"><![CDATA[https://s3.amazonaws.com/nimbus.test.ads/test_video.mp4]]></MediaFile>
                            <MediaFile id="348109700" height="720" width="1280" bitrate="1612" type="video/webm" delivery="progressive" maintainAspectRatio="true" scalable="true"><![CDATA[https://s3.amazonaws.com/nimbus.test.ads/test_video.mp4]]></MediaFile>
                        </MediaFiles>
                    </Linear>
                </Creative>
                <Creative id="00000" AdID="00000" sequence="1">
                    <CompanionAds />
                </Creative>
            </Creatives>
        </InLine>
    </Ad>
</VAST>
```

FIG. 6D

PROGRAMMATIC ADVERTISING SERVER

CROSS-REFERENCE TO RELATED APPLICATION

This application is a continuation of U.S. patent application Ser. No. 18/057,506 filed on Nov. 21, 2022, which is a continuation of U.S. patent application Ser. No. 16/746,724 filed on Jan. 17, 2020, which claims the benefit of U.S. Provisional Patent Application No. 62/794,314, filed on Jan. 18, 2019, each of which is hereby incorporated by reference herein in its entirety.

BACKGROUND

Embodiments of the present disclosure generally relate to systems, methods, and computer program products for blind, real-time, bidding auctions for advertising in various applications, including mobile applications.

BRIEF SUMMARY

According to embodiments of the present disclosure, systems for, methods for, and computer program products for blind, real-time, bidding auctions for advertising in mobile applications are provided.

In various embodiments, a method is provided where a request for an advertisement is received at a first server from a client device. The request is sent, from the first server, to two or more remote servers. A bid value and an asset to be presented at the client device is received from each of the two or more remote servers. A highest bid is determined from the received bid values. Whether the asset associated with the highest bid is compliant based on the request is determined. When the asset is determined to be compliant, the asset is sent to the client device.

In various embodiments, the request includes an indication of advertising inventory for sale. In various embodiments, the indication of advertising inventory includes an indication of a video advertisement or a static advertisement. In various embodiments, the request includes at least one of make, model, and manufacturer of the client device. In various embodiments, the request includes a user agent string of the client device. In various embodiments, the request includes a network connection of the client device. In various embodiments, the request includes an advertising identification linked to a current user of the client device. In various embodiments, the request includes user information. In various embodiments, the user information includes at least one of: location, gender, age, birth year, and keywords describing the user. In various embodiments, the request conforms to an OpenRTB specification. In various embodiments, the request is an initial request and the method further includes generating a modified request based on the initial request. In various embodiments, generating the modified request includes automatically revising the request with unsupplied information. The unsupplied information includes at least one of: device information, user details, and application details.

In various embodiments, the method further includes, when the asset is determined to be non-compliant, marking the asset as noncompliant, determining a next-highest bid from the received bid values, and determining whether the asset associated with the next-highest bid is compliant based on the request. In various embodiments, the asset includes a video ad servicing template (VAST) specification. In various embodiments, determining whether the asset associated with the highest bid is compliant includes unwrapping the asset. In various embodiments, unwrapping includes: parsing text data of the asset and removing one or more uniform resource locators (URLs) in the text data, said one or more URLs pointing to other video ad servicing templates (VAST). In various embodiments, removing one or more URLs is performed until a URL pointing to the asset is identified. In various embodiments, removing one or more URLs is performed for up to ten layers. In various embodiments, the URL pointing to the asset includes a content delivery network (CDN) address. In various embodiments, the method further includes validating the asset after unwrapping. In various embodiments, validating the asset includes determining whether the CDN address comprises an accessible creative. In various embodiments, a creative is any advertising media (e.g., static or video) that is configured to be displayed on a client device (e.g., mobile application). In various embodiments, validating the asset includes determining whether the CDN address includes a creative having a content type capable of being presented on the client device. In various embodiments, validating the asset includes determining whether a labelled content type matches a true content type of the creative. In various embodiments, validating the asset includes determining whether the CDN address comprises a creative having a bit rate capable of being presented on the client device.

In various embodiments, validating the asset comprises removing metadata and trackers from the asset. In various embodiments, after validating the asset, the method includes inserting the removed metadata and trackers back into the asset. In various embodiments, determining whether the asset associated with the highest bid is compliant is performed in less than or equal to 20 ms. In various embodiments, the two or more remote servers includes one or more supply side providers, one or more demand side providers, and/or one or more advertising exchanges. In various embodiments, the client device may be a mobile device.

In various embodiments, a system is provided including a primary server, two or more remote servers, a client device, and a computing node including a computer readable storage medium having program instructions embodied therewith. The program instructions are executable by a processor of the computing node to cause the processor to perform a method where a request for an advertisement is received at a first server from a client device. The request is sent, from the first server, to two or more remote servers. A bid value and an asset to be presented at the client device is received from each of the two or more remote servers. A highest bid is determined from the received bid values. Whether the asset associated with the highest bid is compliant based on the request is determined. When the asset is determined to be compliant, the asset is sent to the client device.

In various embodiments, the request includes an indication of advertising inventory for sale. In various embodiments, the indication of advertising inventory includes an indication of a video advertisement or a static advertisement. In various embodiments, the request includes at least one of make, model, and manufacturer of the client device. In various embodiments, the request includes a user agent string of the client device. In various embodiments, the request includes a network connection of the client device. In various embodiments, the request includes an advertising identification linked to a current user of the client device. In various embodiments, the request includes user information. In various embodiments, the user information includes at least one of: location, gender, age, birth year, and keywords describing the user. In various embodiments, the request conforms to an OpenRTB specification. In various embodiments, the request is an initial request and the method further includes generating a modified request based on the initial request. In various embodiments, generating the modified request includes automatically revising the request with unsupplied information. The unsupplied information includes at least one of: device information, user details, and application details.

In various embodiments, the method further includes, when the asset is determined to be non-compliant, marking the asset as noncompliant, determining a next-highest bid from the received bid values, and determining whether the asset associated with the next-highest bid is compliant based on the request. In various embodiments, the asset includes a video ad servicing template (VAST) specification. In various embodiments, determining whether the asset associated with the highest bid is compliant includes unwrapping the asset. In various embodiments, unwrapping includes: parsing text data of the asset and removing one or more uniform resource locators (URLs) in the text data, said one or more URLs pointing to other video ad servicing templates (VAST). In various embodiments, removing one or more URLs is performed until a URL pointing to the asset is identified. In various embodiments, removing one or more URLs is performed for up to ten layers. In various embodiments, the URL pointing to the asset includes a content delivery network (CDN) address. In various embodiments, the method further includes validating the asset after unwrapping. In various embodiments, validating the asset includes determining whether the CDN address comprises an accessible creative. In various embodiments, validating the asset includes determining whether the CDN address includes a creative having a content type capable of being presented on the client device. In various embodiments, validating the asset includes determining whether a labelled content type matches a true content type of the creative. In various embodiments, validating the asset includes determining whether the CDN address comprises a creative having a bit rate capable of being presented on the client device.

In various embodiments, validating the asset comprises removing metadata and trackers from the asset. In various embodiments, after validating the asset, the method includes inserting the removed metadata and trackers back into the asset. In various embodiments, determining whether the asset associated with the highest bid is compliant is performed in less than or equal to 20 ms. In various embodiments, the two or more remote servers includes one or more supply side providers, one or more demand side providers, and/or one or more advertising exchanges. In various embodiments, the client device may be a mobile device.

In various embodiments, a computer program product is provided for auctioning advertising inventory. The computer program product includes a computer readable storage medium having program instructions embodied therewith. The program instructions are executable by a processor to cause the processor to perform a method where a request for an advertisement is received at a first server from a client device. The request is sent, from the first server, to two or more remote servers. A bid value and an asset to be presented at the client device is received from each of the two or more remote servers. A highest bid is determined from the received bid values. Whether the asset associated with the highest bid is compliant based on the request is determined. When the asset is determined to be compliant, the asset is sent to the client device.

In various embodiments, the request includes an indication of advertising inventory for sale. In various embodiments, the indication of advertising inventory includes an indication of a video advertisement or a static advertisement. In various embodiments, the request includes at least one of make, model, and manufacturer of the client device. In various embodiments, the request includes a user agent string of the client device. In various embodiments, the request includes a network connection of the client device. In various embodiments, the request includes an advertising identification linked to a current user of the client device. In various embodiments, the request includes user information. In various embodiments, the user information includes at least one of: location, gender, age, birth year, and keywords describing the user. In various embodiments, the request conforms to an OpenRTB specification. In various embodiments, the request is an initial request and the method further includes generating a modified request based on the initial request. In various embodiments, generating the modified request includes automatically revising the request with unsupplied information. The unsupplied information includes at least one of: device information, user details, and application details.

In various embodiments, the method further includes, when the asset is determined to be non-compliant, marking the asset as noncompliant, determining a next-highest bid from the received bid values, and determining whether the asset associated with the next-highest bid is compliant based on the request. In various embodiments, the asset includes a video ad servicing template (VAST) specification. In various embodiments, determining whether the asset associated with the highest bid is compliant includes unwrapping the asset. In various embodiments, unwrapping includes: parsing text data of the asset and removing one or more uniform resource locators (URLs) in the text data, said one or more URLs pointing to other video ad servicing templates (VAST). In various embodiments, removing one or more URLs is performed until a URL pointing to the asset is identified. In various embodiments, removing one or more URLs is performed for up to ten layers. In various embodiments, the URL pointing to the asset includes a content delivery network (CDN) address. In various embodiments, the method further includes validating the asset after unwrapping. In various embodiments, validating the asset includes determining whether the CDN address comprises an accessible creative. In various embodiments, validating the asset includes determining whether the CDN address includes a creative having a content type capable of being presented on the client device. In various embodiments, validating the asset includes determining whether a labelled content type matches a true content type of the creative. In various embodiments, validating the asset includes determining whether the CDN address comprises a creative having a bit rate capable of being presented on the client device.

In various embodiments, validating the asset comprises removing metadata and trackers from the asset. In various embodiments, after validating the asset, the method includes inserting the removed metadata and trackers back into the asset. In various embodiments, determining whether the asset associated with the highest bid is compliant is performed in less than or equal to 20 ms. In various embodiments, the two or more remote servers includes one or more supply side providers, one or more demand side providers, and/or one or more advertising exchanges. In various embodiments, the client device may be a mobile device.

BRIEF DESCRIPTION OF THE DRAWINGS

FIG. 5 illustrates an exemplary flow diagram of a programmatic advertising system according to an embodiment of the present disclosure.

FIG. 6A-6D illustrates a process for unwrapping an asset according to an embodiment of the present disclosure.

DETAILED DESCRIPTION

Figure 1:
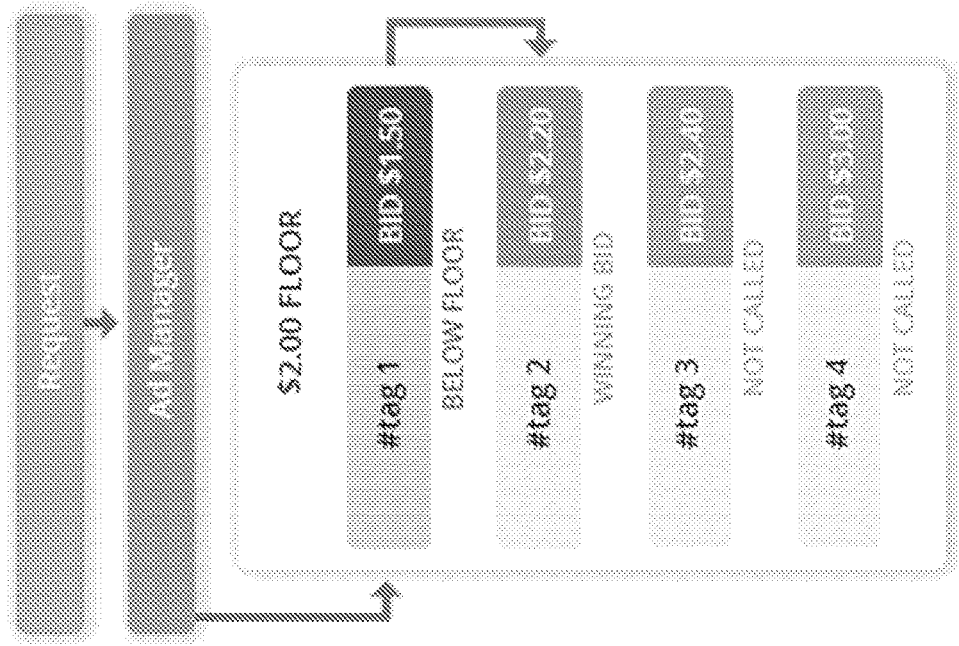
FIG. 1 illustrates an exemplary waterfall solution for cross-network calls to communicate between DSPs and SSPs.

The programmatic advertising systems, methods, and computer program products described herein provide a modern solution to in app monetization using a highly optimized server to server (S2S) real time bidding (RTB) solution. The current monetization ecosystem focuses heavily on the desktop world. That is, it focuses heavily on websites. Advertisers often do not understand the difference between the two mediums. As a result, ads that are normally displayed in the desktop world get recycled and reused within mobile environments. This creates a suboptimal environment for the advertiser, publisher, and users alike.

In the desktop world, ads may be referred to as tags. Tags are characteristically snippets of JavaScript that a publisher can copy and paste into hypertext markup language (HTML). These tags make cross-site network calls to communicate with demand side providers (DSPs) and supply side providers (SSPs) in order to sell ads on a website. This flow may not work well within certain environments, including mobile environments.

As a result, various methods may be used to help advertisers bridge the gap between other platform (e.g., mobile) monetization and desktop. These methods include mobile software development kits (SDKs) used to bridge the communication gap between DSPs/SSPs and publishers. The SDKs allow mobile publishers to quickly monetize their apps with advertisements while adding SDK bloat (increased app sizes), latency, and a buyer-side bias.

However, one issue with an SDK solution is that it is not transparent to the publisher how their app is being monetized. The SDK solution may also have the same inefficiencies as the desktop world. These inefficiencies may be due to the waterfall setup that advertisers, DSPs, and SSPs may be accustomed to working with.

In various embodiments, the systems described herein relate to an efficient ad server that uses server to server connections with DSPs and SSPs to perform blind, real time bidding auctions across multiple creative types. In various embodiments, a lightweight SDK may be used to interface with the ad server disclosed herein. In various embodiments, no SDK is necessary to interface with the ad server disclosed herein. As a result, the systems disclosed herein create a fair and fast auction that brings both transparency to the publisher and increases overall revenue.

In various embodiments, hardware may be used in hosting the auction within a cloud infrastructure. In various embodiments, the code may be written with concurrent functions and latency may be reduced. In various embodiments, latency may be measured in milliseconds. In various embodiments, by allowing mobile applications to access the ad server without an SDK or with a lightweight SDK, application sizes are not significantly impacted (e.g., not increased). In various embodiments, integrating a demand source for a publisher does not require an update to the app, as all integrations are handled on the backend.

In various embodiments, if a lightweight SDK is used, the client device SDK may include a requesting and rendering component, which can be used independently from one another that allows a publisher to make a request to the ad server to sell ad-space inventory and on a winning bid, render the ad from the returned markup. In various embodiments, a publisher can use the requesting component to only generate requests to the ad server but render the ad markup using an implementation of their choosing if it supports the open standards defined by the interactive advertising bureau (IAB) (e.g., MRAID, VAST, VPAID, etc.) or the publisher can generate requests to the ad server using their own implementation on the client or server side but render the ad markup using the rendering component of the SDK. In various embodiments, usage of the SDK regardless of which components are included may require that the component be initialized during application startup by providing a publisher key and API key as parameters to an initialize function.

In various embodiments, the requesting component of the SDK generates requests to the ad server for ad-space inventory using unrestricted device information such as the make, model, and manufacturer of the device, the device's webbrowser user agent string, the type of physical network connection (4G, 3G, wifi, etc.), and the system-provided advertising ID that is linked to the current user of the device. In various embodiments, the requesting component may also include details provided by the publisher about the mobile application, the SDK implemented in the app, and/or information about the user of the app. In various embodiments, user information can include the location, gender, age, year of birth, and keywords describing the user. In various embodiments, the publisher can inform the SDK if the user is subject to regulations such as CCPA or GDPR and include information related to those regulations that will be passed in each request to the ad server from the SDK. In various embodiments, users of the requesting component generate requests using a class, which may be an implementation of the OpenRTB specification. In various embodiments, the class may provide helper methods to fill inventory for banner ads, video ads, or a hybrid interstitial that can fill a banner or video ad in the provided ad-space. In various embodiments, an object may be passed to a request manager function to fill in the remaining device, user, and app details and finally send the request to the ad server to start an auction. In various embodiments, a winning auction will return a response which contains information about the buyer of the ad such as the demand source and winning bid price, as well as the type of ad (banner or video) and the markup to render the ad.

In various embodiments, the rendering component of the SDK provides a plugin architecture that allows the publisher to customize the rendering of different ad markups. In various embodiments, the SDK includes renderers for static (Banner/WebView display) and video ad markup. In various embodiments, the static renderer of the SDK may rely on the client device's implementation (e.g., of WebView) that is capable of rendering HTML, markup and is augmented with the SDK implementation of a specification (e.g., MRAID 3.0) that allows an ad access to some native features of the device to enhance the experience for the end user. In various embodiments, the video renderer may use a publicly available SDK to parse a response containing VAST extendable markup language (XML) and handles the creation of the native video player for the ad as well as reporting tracking and conversion events back to the ad server and demand partners. In various embodiments, renderers can be added or replaced in the client SDK by implementing the renderer interface and installing the implementation for an ad type. For example, a custom video renderer could replace the default renderer provided by the SDK or a renderer for a new type such as a social network's native ads can also be installed. In various embodiments, all Renderers may provide an implementation of an ad controller interface defined in the SDK, which provides a single API for interacting with all the different ad types, allowing the publisher to reuse the same implementation logic to display an ad regardless if it is a video ad which can start and stop playback or a banner ad that display a static image.

In various embodiments, in a full client-side implementation, the requesting and rendering components may be combined with an ad manager class. This class serves as a bridge between the components by providing all of the relevant methods to set details global to all requests as well as make the requests themselves and handle the response by sending it to any installed renderers. In various embodiments, the method to request and render an ad is called may accept as its parameters a request object and a container to render the ad inside. In various embodiments, the client SDK may provide extensions for including third party SDK-based demand. In various embodiments, the third-party SDKs may be included by the publisher in its app and subsequently registered with the ad server SDK.

FIG. 1 shows an exemplary waterfall solution 100 for cross-network calls to communicate between DSPs and SSPs, showing both the bid floor and the sequential flow of the system. Waterfall solutions, like that shown in FIG. 1, are like a daisy chain, where one ad call falls back to the other. Likewise, in order to integrate new demand, source publishers would also have to install the SDK of each demand source in the waterfall, which drastically increases the app's overall size.

Using what are called "floors" a publisher controls what they suspect a DSP or SSP will pay to sell an ad. This system is both slow, introduces a lot of human error, and adds management costs. It requires a system to make N sequential network calls to buyers to see if the buyer wants to sell an ad for the asking price or floor, which increases latency. It also requires that a publisher has a programmatic ads manager to set those floors, monitor the floors, and change the configuration of the waterfall.

Additionally it removes overall control from the publisher on how their audiences are monetized. The buyer at the top of the chain controls the programmatic ad stack. This flow always favors the DSP or SSP. That is because the DSP or SSP that is at the top gets to cherry pick who they want to buy on. The second issue is that the ad is never sold at market value. That is to say that DSP or SSP can sell an ad for an unreasonably low price because they are not competing against each other. Lastly, each network call is done sequentially, which adds latency. The longer it takes to show a user an ad the less likely that ad will be seen. That is bad for DSPs/SSPs, advertisers, and publishers alike.

Figure 2:
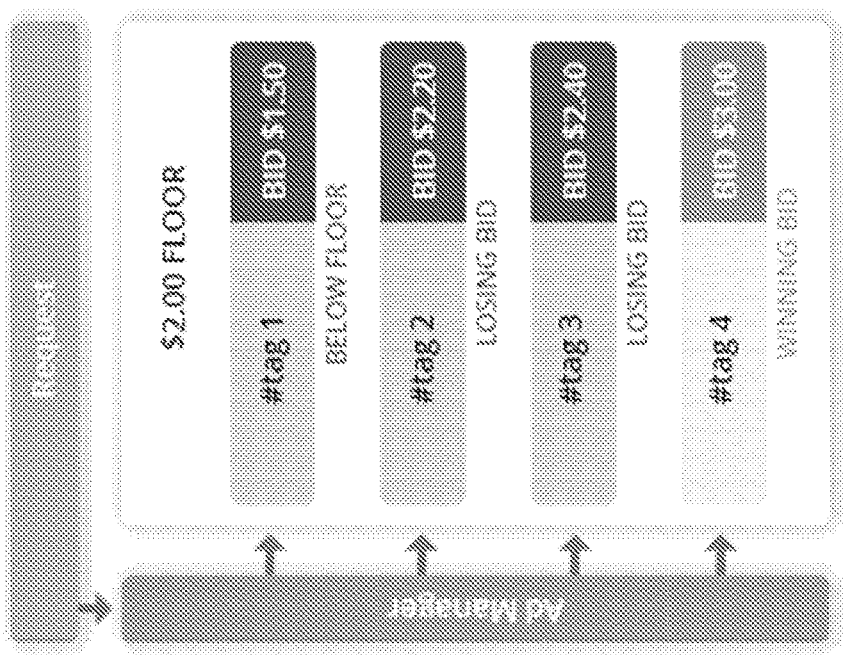
FIG. 2 illustrates an exemplary header bidding system.

Methods using mobile SDKs may allow publishers to install an SDK to quickly monetize their audiences. FIG. 2 illustrates a header bidding system 200, showing all the highest bidder winning the auction regardless of order. A header bidding system 200 mitigates some of the issues around latency because all DSPs and SSPs are asked concurrently to bid. However, the header bidding system 200 still relies heavily on legacy tag based integrations. This means that floors still have to be managed across multiple DSPs and SSPs.

Figure 3:
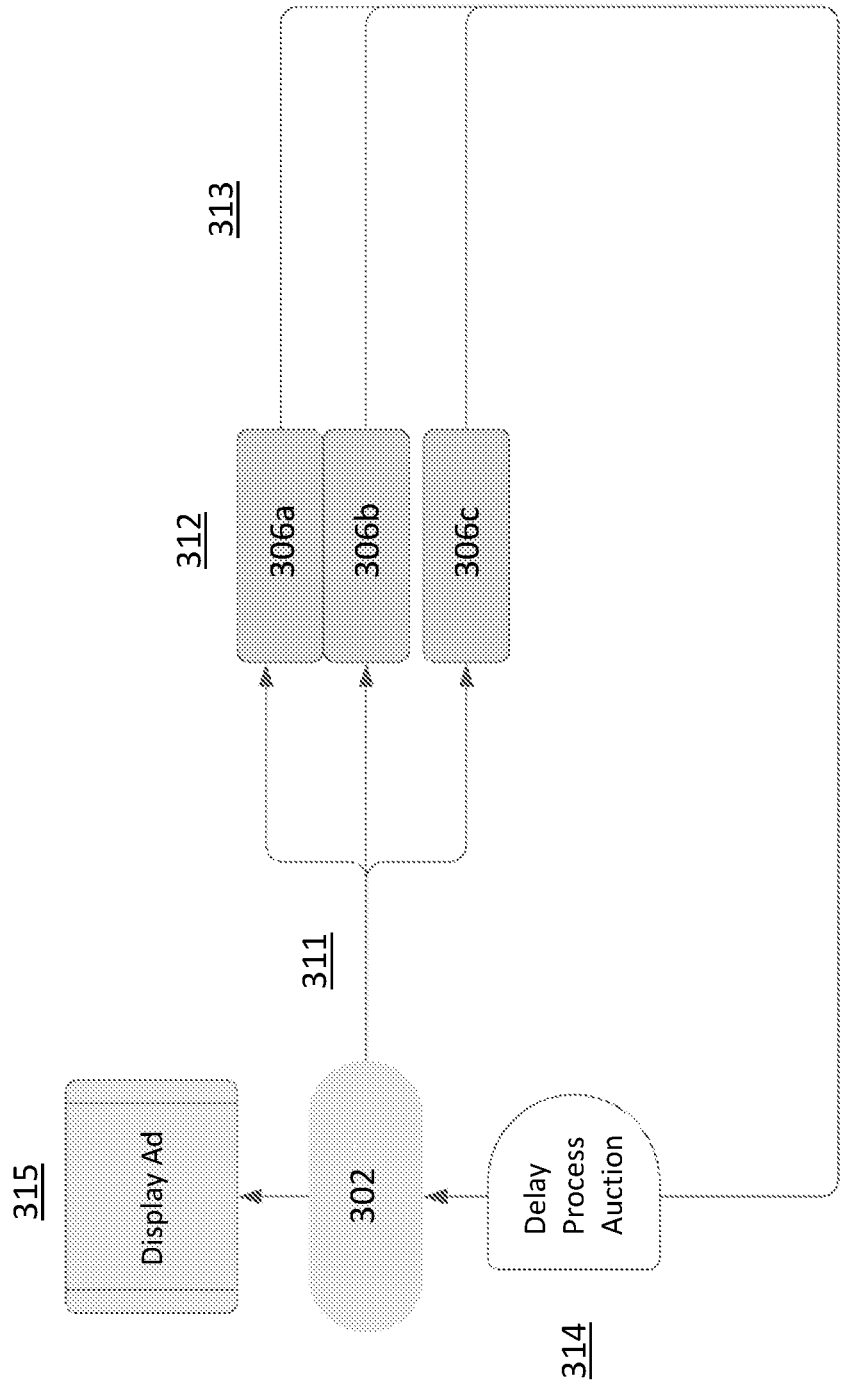
FIG. 3 illustrates an exemplary flow diagram of a header bidding system.

FIG. 3 illustrates an exemplary flow diagram of a header bidding system 300. In header bidding as shown in FIG. 3, the client 302 may be a mobile device. The mobile device may have limited internet speed. At 311, the client 302 makes a predetermined number of network calls to two or more demand sources 306a-306c. At 312, the two or more demand sources 306a-306c perform any necessary actions (e.g., auctions) on their respective servers. At 313, each of the demand sources 306a-306c then submit a bid value and, in some embodiments, a creative to the client 302. It is not always the case that a creative will be sent back at 313 and, in some embodiments, a secondary network call is made by the client 302 to fetch the creative from one or more of the demand sources 306a-306c. At 314, the client 302 sorts through the bid responses that came back before the client timeouts (often many seconds later) are met. At 315, the client 302 attempts to render the asset.

Figure 4:
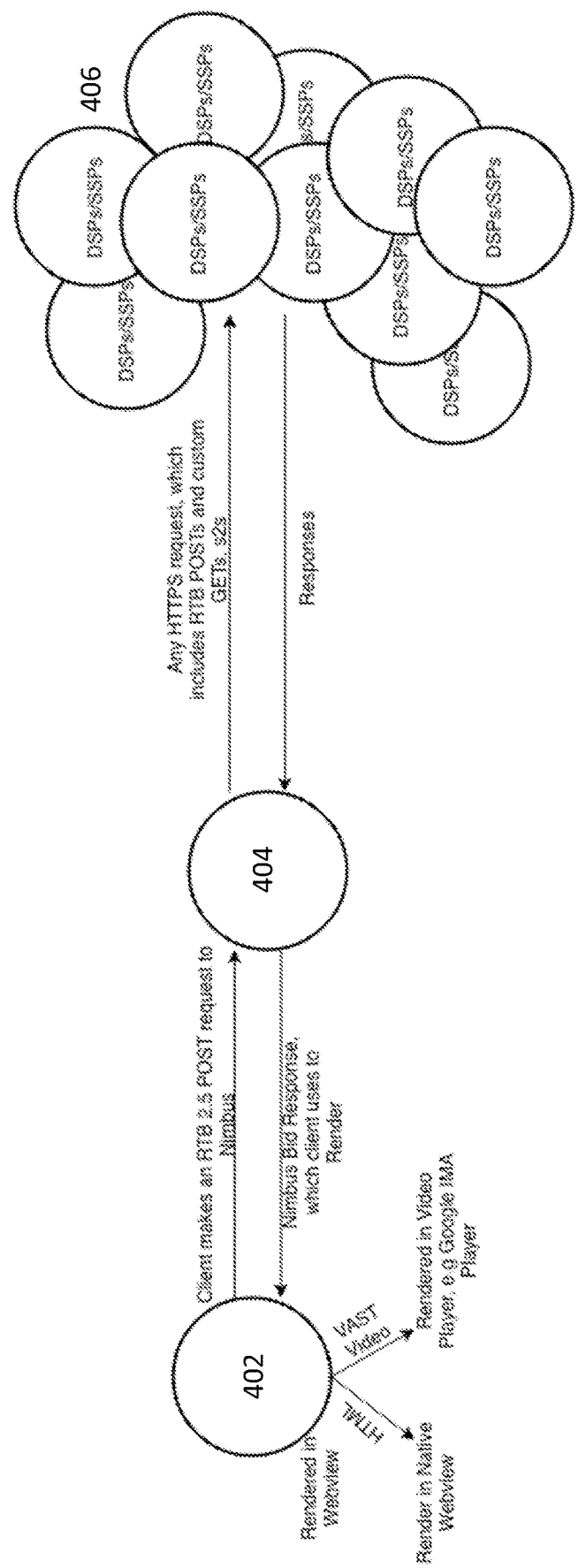
FIG. 4 illustrates an exemplary system diagram of a programmatic advertising system according to an embodiment of the present disclosure.

FIG. 4 illustrates an exemplary flow diagram 400 of a programmatic advertising system according to an embodiment of the present disclosure. In various embodiments, the advertising system 400 is unlike waterfall solutions and solves issues that come with a waterfall bidding system, such as latency, yield, transparency, fairness, and efficiency. In various embodiments, the advertising system runs a (real-time bidding) RTB auction on the behalf of publishers. In various embodiments, the advertising system 300 does not require or use a software development kit (SDK) to run these auctions. In various embodiments, SDKs allow publishers to quickly monetize their apps, but may introduce latency and may be inherently opaque. In various embodiments, because the advertising system 400 holds the auction on a backend service (e.g., remote machines living on a cloud infrastructure), it is not subject to the same network latencies as a SDK. In various embodiments, where an SDK is used, the SDK may require the use of the mobile device's network speed, e.g., WIFI, 4g, 3g. In various embodiments, network speed may be highly variable for certain mobile devices, which means that SDKs may not be able to perform or guarantee constant high performance. In various embodiments, highly concurrent network calls being made on a mobile device in the case of the SDK bidding solutions suffer from the same inadequacies. In various embodiments, SDKs may require the use of the hardware of the device on which the code resides. In various embodiments, some handheld mobile devices may not contain hardware sufficient to run high performance and concurrent auctions. In various embodiments, the advertising system 400 may remove the cost of latency, which increases DSPs/SSPs, advertisers, and publishers overall yield.

In various embodiments, the advertising system 400 as an ad server is fully transparent. In various embodiments, because the advertising system 400 does not have its own demand, auctions may be operated fairly among bidders. In various embodiments, the advertising system 400 does not give priority to any single DSP or SSP. In various embodiments, the advertising system 400 does not use a tag-based system. In various embodiments, floors may not be required to be managed. In various embodiments, the advertising system 400 may use the RTB protocol to conduct auctions. Additional information on the RTB protocol is available in the OpenRTB API Specification Version 2.5, IAB Technology Laboratory 2016. In various embodiments, each DSP and SSP bids in a blind auction. Buyers are forced to pay what is closer to market value for the inventory instead of relying on the tag based or waterfall buyer favored implementation. This increases publisher side yield.

In various embodiments, the advertising system 400 may optimize the auction process in ways no other system does. Many systems used tag based implementations to determine the creative type. An auction or waterfall solution can typically only return one type of creative, such as, for example, either a static/banner ad type or a video ad type. In various embodiments, if a publisher can display either creative in the same placement location, the publisher may be forced to choose between both creative types (i.e., banner or video) or request for each creative separately, which may increase latency and decreases yield. In various embodiments, the advertising system 400 runs a multiple creative single call auction. In various embodiments, the advertising system 400 may return the highest paying valid ad to the publisher, which increases yield and performance.

In various embodiments, the advertising system 400 includes two interfaces: Auctionable and Demand. In various embodiments, Auctionable defines the behavior around requesting the bids from each demand source, retrieving the ad markup from the winning demand source, and logging the demand sources canonical name. In various embodiments, Demand defines the behavior each demand source must implement to satisfy requirements around its ads and their creative types. It also defines how the advertising system 400 communicates with the DSP or SSP.

In various embodiments, a client 402 requests that an advertising system 404 starts an auction. The client 402 communicates to the advertising system 404 via an HTTPS POST request, where the body of the request is an extended 2.5 RTB object. Because each demand source's implementation is very different from each other, the advertising system 404 de-normalizes the received RTB object and sends the information concurrently downstream to each DSP and SSP 406 in the manner that those systems understand. For each auction, a timeout is set by the publisher. If no timeout is set, then the advertising system 404 defaults to a default value, e.g., 500 ms. If a demand source takes longer than the timeout, the Transmission Control Protocol (TCP) connection is closed immediately and that demand source's bid is no longer valid. After receiving all the bids within the set timeout, the advertising system 404 normalizes that information and sorts the bids by highest effective cost per thousand impressions (ECPM). Each bid in the array is then iterated on to check for validity or in some cases to fetch the creative's markup. If the bid has the highest ECPM and is valid, regardless of creative type, that ad is served back to the client.

In various embodiments, the advertising system 404 may determine if a Static/HTML/Banner ad is valid. In various embodiments, the markup may be valid HTML. In various embodiments, determining the validity of a video ad (VAST XML) may involve checking that the mime types the publisher requested are present. In various embodiments, the advertising system 404 checks that the VAST XML has been implemented properly. It is often the case that human error causes the VAST XML to be incorrect, which causes the video to not be rendered on the publisher's app. This leads to revenue loss for the publisher, DSPs/SSPs, and advertisers alike. As a result, the advertising system 404 mitigates the risk of running video ads by validating the creative before sending it to the client to render.

In various embodiments, the advertising system 404 may provide Multi-Creative Auctions. In various embodiments, the extended RTB 2.5 object that the advertising system 404 requires the client send, allows for the request.imp object to contain multiple creative formats within a single request. For instance, a request.imp object containing both the banner object and the video object tells the advertising system 404 that the publishers wishes to trigger an auction where Static/HTML/Banner ads are competing against video VAST XML ads. This increases the publisher's fill while also increasing the overall ECPM. All other systems segregate creative types, while the advertising system 404 optimizes by allowing all creative types to compete in a single unified auction at the publisher's discretion.

FIG. 5 illustrates an exemplary flow diagram 500 of a programmatic advertising system according to an embodiment of the present disclosure. In FIG. 5, the client device (e.g., mobile device) 502 may have an internet speed that is limited to a predetermined speed. In various embodiments, at 511, the client device 502 makes a request (e.g., a call) to ad server 504. In various embodiments, the request may be a single request. In various embodiments, at 512, the ad server 504 makes network calls to two or more demand sources 506a-506c. In various embodiments, the two or more demand sources may be DSPs. In various embodiments, the two or more demand sources may be SSPs. In various embodiments, the two or more demand sources may be exchanges. In various embodiments, the two or more demand sources may include a remote server. In various embodiments, at 513, each of the two or more demand sources 506a-506c then perform any necessary auctions on their side to determine a bid and creative to present to the ad server 504. In various embodiments, at 513, the demand sources 506a-506c submit a bid value and, optionally, a creative to the client. In various embodiments, a secondary network call is made to fetch the creative from the corresponding demand source 506a-506c. In various embodiments, at 514, the ad server 504 sorts the bids and/or corresponding assets. In various embodiments, at 514, the ad server 504 unwraps the asset(s). In various embodiments, at 514, the ad server 504 validates the assets from the bid responses. In various embodiments, at 514, the ad server 504 validates the returned assets before a predetermined timeout (e.g., 500 ms). In various embodiments, at 515, the ad server 504 returns the asset back to the client device 502 for rendering. In various embodiments, at 516, the client device 502 renders the asset for the user.

In various embodiments, the request includes an indication of advertising inventory for sale. For example, the request may indicate one or more static (e.g., banner) ads and/or one or more video ads that are for sale. In various embodiments, the request may include make, model, and manufacturer of the client device. In various embodiments, the request may include a user agent string of the client device. In various embodiments, the request may include information regarding a network connection of the client device. For example, the request may indicate network type, such as, for example, wifi, 5G, 4G, 3G, etc. and/or speed of the network. In various embodiments, the request may include an advertising identification linked to a current user of the client device. In various embodiments, the request may include user information (e.g., location, gender, age, birth year, and keywords describing the user). In various embodiments, the ad server may fill in details into the original request thereby generating a modified request. In various embodiments, the details filled-in may be unsupplied information.

In various embodiments, the asset received at the ad server with the winning bid may be unwrapped. In various embodiments, text data of the asset may be parsed. In various embodiments, one or more URLs may be removed from the text data. In various embodiments, the removed URL(s) may point to other video ad servicing templates (VAST). In various embodiments, unwrapping is performed until a URL pointing to the asset is identified. In various embodiments, the URL pointing to the asset comprises a content delivery network (CDN) address.

In various embodiments, the fully unwrapped asset may be validated against requirements of the client device. For example, if the client device can only render one type of video, then only that type of video should be passed along to the client device. In various embodiments, validating the asset comprises determining whether the CDN address comprises an accessible creative. For example, the ad server may access the link to determine that the link is valid. In various embodiments, the ad server may receive all or a portion of the advertisement from the source. In various embodiments, the ad server may use all or a portion of the advertisement in determining whether the advertisement is valid for the particular client device. In various embodiments, validating the asset comprises determining whether the CDN address comprises a creative having a content type capable of being presented on the client device. In various embodiments, validating the asset comprises determining whether a labelled content type matches a true content type of the creative. In various embodiments, validating the asset comprises determining whether the CDN address comprises a creative having a bit rate capable of being presented on the client device. In various embodiments, validating the asset is performed in less than or equal to a predetermined amount of time (e.g., 20 ms). In general, validating the asset should be performed well within the overall timeout period.

FIG. 6A-6D illustrates a process for unwrapping an asset according to an embodiment of the present disclosure. FIG. 6A shows a wrapped asset including Video Ad Serving Template (VAST) code (e.g., XML) that is provided to an ad server of the present disclosure. In FIG. 6A, a first VAST ad tag URI is removed. FIG. 6B-6C show further unwrapping steps where all trackers and/or metadata are unwrapped (i.e., removed) and stored for later use (e.g., insertion back into the fully unwrapped document). In FIG. 6B, a second VAST ad tag URI is removed. In FIG. 6C, a third VAST ad tag URI is removed. In various embodiments, this step may be performed by calling a function (e.g., VastAdTagURL). In various embodiments, the unwrapping process may be repeated up to a predetermined limit of times. In various embodiments, the unwrapping process may be performed anywhere from one to up to any suitable number (e.g., ten) times. FIG. 6D shows a fully unwrapped asset that points to a media file (i.e., the advertisement to be rendered). In various embodiments, the fully unwrapped asset may include a URL pointing to the advertisement to be shown. In various embodiments, the fully unwrapped asset may include an identification number. In various embodiments, the fully unwrapped asset may include one or more tracking events.

In various embodiments, as shown in FIG. 6D, the asset is now inline and all media assets may be retrieved from the XML, e.g., the MediaFiles Object. In various embodiments, the fully unwrapped asset includes one or more URLs pointing to media files to be rendered. In various embodiments, the media file(s) may include any suitable video file type (e.g., mp4). In various embodiments, the media file(s) may include any suitable static image type, including compressed or lossless types (e.g., png, jpg, tiff, etc.). In various embodiments, the bit rate of the media file(s) may be checked to confirm that the bit rate is within bounds of a publisher's request. In various embodiments, if the bit rate is out of bounds (e.g., too high or too low), the asset is labeled as noncompliant. In various embodiments, the ad server may confirm whether the file type is within accepted parameters (e.g., Mime-Types) set by the publisher. In various embodiments, the ad server may perform concurrent network calls to the server (e.g., CDN) hosting the advertisement. In various embodiments, if the server hosting the advertisement is down and/or slow (e.g., times out), the ad server may mark the asset as noncompliant. In various embodiments, the ad server may compare a returned content type of the advertisement to one or more predetermined Mime-types (e.g., set by the publisher). In various embodiments, the ad server may scan the XML structure for validity. In various embodiments, the ad server may move objects in the XML code around based on a given specification (e.g., VAST 1.0, VAST 2.0, or VAST 3.0) to ensure compliance and maximize the chance of the advertisement rendering at the client device.

In various embodiments, when a noncompliant advertisement is identified, the ad server will select the next highest bid to confirm whether that next highest bid has a compliant advertisement. In various embodiments, when a valid media file is determined to exist, the stored metadata and/or trackers from the bidder (e.g., DSP, SSP, and/or exchange) may be inserted back into the inline document (e.g., XML document). In various embodiments, the ad server may insert its own metadata and/or trackers into the inline document. In various embodiments, after the metadata and trackers are inserted back into the inline document, the asset is returned to the client device for rendering.

Figure 7:
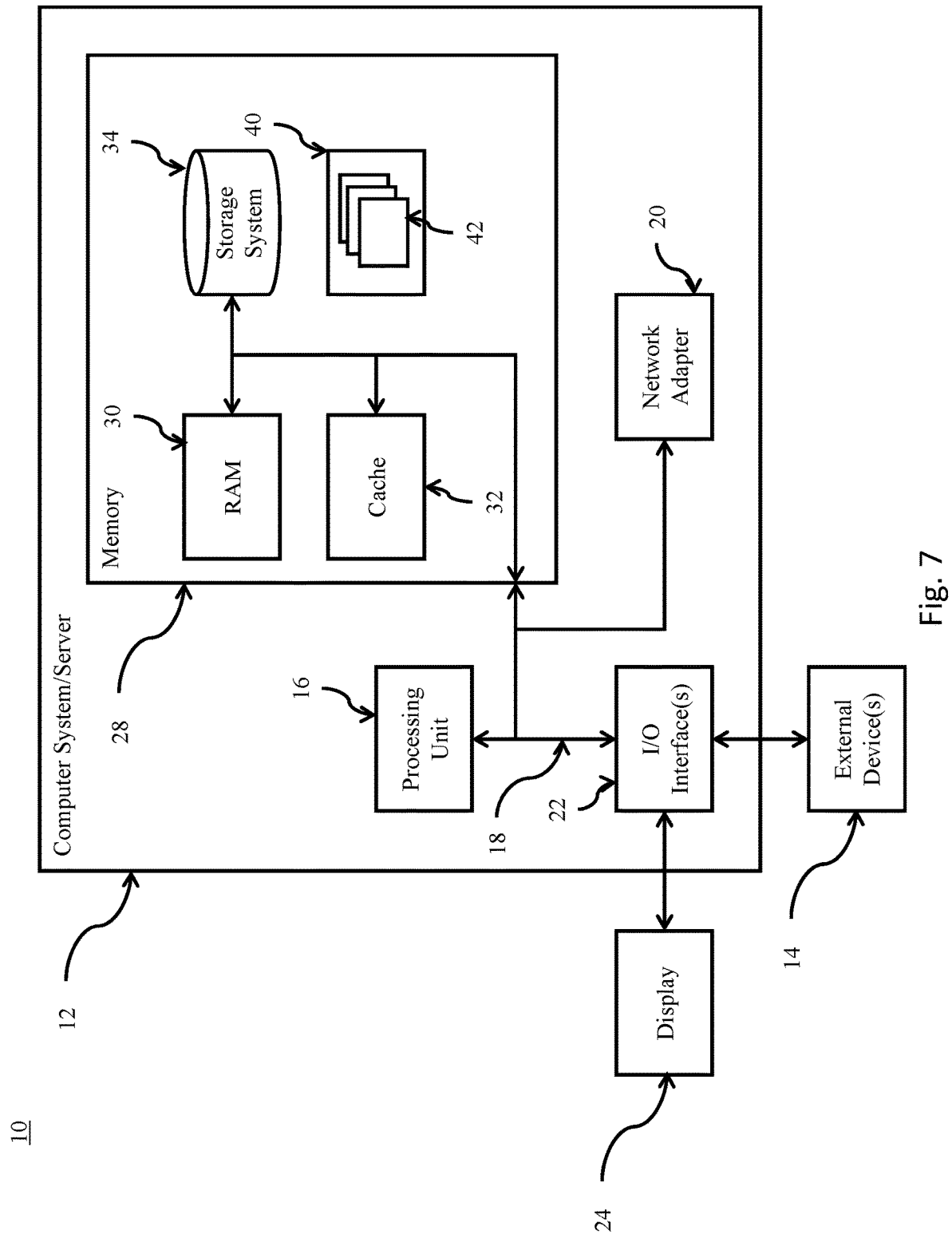
FIG. 7 depicts an exemplary computing node according to various embodiments of the present disclosure.

Referring now to FIG. 7, a schematic of an exemplary computing node is shown that may be used with the computer vision systems described herein. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in computing node 10 is shown in the form of a general-purpose computing device. The components of computer system/ server 12 may include, but are not limited to, one or more processors or processing units 16, a system memory 28, and a bus 18 coupling various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In other embodiments, the computer system/server may be connected to one or more cameras (e.g., digital cameras, light-field cameras) or other imaging/sensing devices (e.g., infrared cameras or sensors).

The present disclosure includes a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In various embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In various alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving, at a first server, a request for an advertisement from a client device;
    sending, from the first server, the request to one or more remote servers;
    receiving, from the one or more remote servers, a bid value and an asset to be presented at the client device;
    determining a highest bid from the received bid values;
    determining whether the asset associated with the highest bid is compliant based on the request by unwrapping the asset, wherein unwrapping the asset comprises:
    parsing text data of the asset; and
    removing one or more uniform resource locators in the text data, the one or more URLs pointing to extensible markup language (XML) representing media metadata, wherein removing one or more URLs is performed until a URL pointing to the asset is identified;
    validating the asset after unwrapping; and
    when the asset is determined to be compliant, sending the asset to the client device.

2. The method of claim 1, wherein the request for an advertisement from the application of the client device comprises data identifying the advertising inventory for sale along with the software and hardware environment of the client device.

3. The method of claim 2, wherein the indication of the advertising inventory for sale indicates the type of advertisement for sale.

4. The method of claim 3, wherein the type of advertisement for sale can indicate a video advertisement or a static advertisement.

5. The method of claim 2, wherein the data identifying the software and hardware environment of the client device can include but is not limited to data indicating (i) a make, model, or manufacturer of the client device, (ii) the application executing on the client device, (iii) user information indicating keywords describing a current user of the client device, and (iv) an advertising identification linked to the current user of the client device.

6. The method of claim 1, wherein the method further comprises generating the modified request by:
    de-normalizing the request, and
    revising the request with unsupplied information, said unsupplied information comprising one or more of (i) the make, model, or manufacturer of the client device, (ii) the application executing on the client device, (iii) the user information indicating keywords describing a current user of the client device, and (iv) the advertising identification linked to the current user of the client device.

7. The method of claim 1, further comprising:
    selecting the asset from among the two or more assets by:
    sorting the two or more assets based on the bid values;
    selecting the asset with the highest bid value.

8. The method of claim 7, wherein the method further comprises selecting another asset having the next-highest bid from the sorted two or more assets in response to determining that the selected asset is not compliant based on the request.

9. A system comprising:
a first server connected over a network to one or more remote servers and a client device;
a computing node comprising a computer readable storage medium having program instructions embodied therewith, the program instructions executable by a processor of the computing node to cause the processor to perform a method comprising:
receiving, at the first server, a request for an advertisement from a client device;
sending, from the first server, the request to one or more remote servers;
receiving, from the one or more remote servers, a bid value and an asset values of at least two or more assets to be presented at the client device;
determining whether the asset associated with the highest bid is compliant based on the request by unwrapping the asset, wherein unwrapping the asset comprises:
parsing text data of the asset; and
removing one or more uniform resource locators (URLs) in the text data, the one or more URLs pointing to extensible markup language (XML) representing media metadata, wherein removing one or more URLs is performed until a URL pointing to the asset is identified;
validating the asset after unwrapping; and
when the asset is determined to be compliant, sending the asset to the client device.

10. The system of claim 9, wherein the request for an advertisement from the application of the client device comprises data identifying the advertising inventory for sale along with the software and hardware environment of the client device.

11. The system of claim 10, wherein the indication of the advertising inventory for sale indicates the type of advertisement for sale.

12. The system of claim 11, wherein the type of advertisement for sale can indicate a video advertisement or a static advertisement.

13. The system of claim 10, wherein the data identifying the software and hardware environment of the client device can include but is not limited to data indicating one or more of (i) a make, model, or manufacturer of the client device, (ii) the application executing on the client device, (iii) user information indicating keywords describing a current user of the client device, and (iv) an advertising identification linked to the current user of the client device.

14. The system of claim 9, wherein the method further comprises generating the modified request by:
de-normalizing the request, and
revising the request with unsupplied information, said unsupplied information comprising (i) the make, model, or manufacturer of the client device, (ii) the application executing on the client device, (iii) the user information indicating keywords describing a current user of the client device, and (iv) the advertising identification linked to the current user of the client device.

15. The system of claim 9, wherein the program instructions cause the processor to perform the method further comprising:
selecting the asset from among the two or more assets by:
sorting the two or more assets based on the bid values; and
selecting the asset with the highest bid value.

16. The system of claim 15, wherein the method further comprises selecting another asset having the next-highest bid from the sorted two or more assets in response to determining that the selected asset is not compliant based on the request.

17. A computer program product for auctioning advertising inventory, the computer program product comprising a computer readable storage medium having program instructions embodied therewith, the program instructions executable by a processor to cause the processor to perform a method comprising:
receiving, at a first server, a request for an advertisement from a client device;
sending, from the first server, the request to one or more remote servers;
receiving, from the one or more remote servers, a bid value and an asset to be presented at the client device;
determining whether the asset associated with the highest bid is compliant based on the request by unwrapping the asset, wherein unwrapping the asset comprises:
parsing text data of the asset; and
removing one or more uniform resource locators in the text data, the one or more URLs pointing to extensible markup language (XML) representing media metadata, wherein removing one or more URLs is performed until a URL pointing to the asset is identified;
validating the asset after unwrapping; and
when the asset is determined to be compliant, sending the asset to the client device.

18. The computer program product of claim 17, wherein the request for an advertisement from the application of the client device comprises data identifying the advertising inventory for sale along with the software and hardware environment of the client device.

19. The computer program product of claim 18, wherein the indication of the advertising inventory for sale indicates the type of advertisement for sale.

20. The computer program product of claim 17, wherein the method further comprises generating the modified request by:
de-normalizing the initial request, and
revising the initial request with unsupplied information, said unsupplied information comprising (i) the make, model, or manufacturer of the client device, (ii) the application executing on the client device, (iii) the user information indicating keywords describing a current user of the client device, and (iv) the advertising identification linked to the current user of the client device.

21. A method comprising:
receiving, at a first server, an initial request for an advertisement from an application executing on a client device;
in response to receiving the initial request, generating, by the first server, a modified request by:
de-normalizing the initial request, and
revising the initial request with unsupplied information, said unsupplied information comprising at least one of: (i) a make, model, or manufacturer of the client device, (ii) the application executing on the client device, (iii) user information indicating keywords describing a current user of the client device, and (iv) an advertising identification linked to the current user of the client device;

sending, from the first server, the modified request to one or more remote servers;

receiving, by the first server, from the one or more remote servers, bid values of at least two or more assets to be presented at the client device;

selecting, by the first server, an asset from among the two or more assets based in part on the associated bid values;

determining, by the first server, whether the selected asset is compliant based on the initial request by identifying one or more uniform resource locators (URLs) present in the selected asset; and as a result of the selected asset being compliant, sending, by the first server, the selected asset to the client device.

22. A system comprising:

a first server configured to connect over a network to one or more remote servers and a client device;

a computing node comprising a computer readable storage medium having program instructions embodied therewith, the program instructions executable by a processor of the computing node to cause the processor to perform a method comprising:

receiving, at the first server, an initial request for an advertisement from an application executing on a client device;

in response to receiving the initial request, generating, by the first server, a modified request by:

de-normalizing the initial request, and revising the initial request with unsupplied information, said unsupplied information comprising at least one of: (i) a make, model, or manufacturer of the client device, (ii) the application executing on the client device, (iii) user information indicating keywords describing a current user of the client device, and (iv) an advertising identification linked to the current user of the client device;

sending, from the first server, the modified request to one or more remote servers;

receiving, by the first server, from the one or more remote servers, bid values of at least two or more assets to be presented at the client device;

selecting, by the first server, an asset from among the two or more assets based in part on the associated bid values;

determining, by the first server, whether the selected asset is compliant based on the initial request by identifying one or more uniform resource locators (URLs) present in the selected asset; and as a result of the selected asset being compliant, sending, by the first server, the selected asset to the client device.

23. A computer program product for auctioning advertising inventory, the computer program product comprising a computer readable storage medium having program instructions embodied therewith, the program instructions executable by a processor to cause the processor to perform a method comprising:

receiving, at the first server, an initial request for an advertisement from an application executing on a client device;

in response to receiving the initial request, generating, by the first server, a modified request by:

de-normalizing the initial request, and revising the initial request with unsupplied information, said unsupplied information comprising at least one of: (i) a make, model, or manufacturer of the client device, (ii) the application executing on the client device, (iii) user information indicating keywords describing a current user of the client device, and (iv) an advertising identification linked to the current user of the client device;

sending, from the first server, the modified request to one or more remote servers;

receiving, by the first server, from the one or more remote servers, bid values of at least two or more assets to be presented at the client device;

selecting, by the first server, an asset from among the two or more assets based in part on the associated bid values;

determining, by the first server, whether the selected asset is compliant based on the initial request by identifying one or more uniform resource locators (URLs) present in the selected asset; and as a result of the selected asset being compliant, sending, by the first server, the selected asset to the client device.

\* \* \* \* \*